United States Patent
Douros

(10) Patent No.: US 7,269,563 B2
(45) Date of Patent: Sep. 11, 2007

(54) STRING MATCHING OF LOCALLY STORED INFORMATION FOR VOICE DIALING ON A CELLULAR TELEPHONE

(75) Inventor: Kenneth Douros, South Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 899 days.

(21) Appl. No.: 10/435,979

(22) Filed: May 12, 2003

(65) Prior Publication Data
US 2004/0230435 A1    Nov. 18, 2004

(51) Int. Cl.
*G10L 21/06* (2006.01)
(52) U.S. Cl. .................. 704/275; 379/88.03
(58) Field of Classification Search ............ 704/275; 379/88.03
See application file for complete search history.

(56) References Cited

U.S. PATENT DOCUMENTS

| | | | |
|---|---|---|---|
| 5,651,056 A * | 7/1997 | Eting et al. ............ 379/88.01 |
| 5,752,231 A * | 5/1998 | Gammel et al. .......... 704/273 |
| 5,901,214 A * | 5/1999 | Shaffer et al. ......... 379/211.02 |
| 6,058,179 A * | 5/2000 | Shaffer et al. ......... 379/220.01 |
| 6,167,117 A * | 12/2000 | Will ....................... 379/88.03 |
| 6,167,118 A * | 12/2000 | Slivensky ............... 379/88.03 |
| 6,480,819 B1 | 11/2002 | Boman et al. |
| 6,665,377 B1 * | 12/2003 | McKinley et al. ...... 379/88.01 |
| 6,836,651 B2 * | 12/2004 | Segal et al. .............. 455/405 |
| 7,072,838 B1 * | 7/2006 | Ghosh et al. ............. 704/257 |
| 2002/0156774 A1 | 10/2002 | Beauregard et al. |
| 2002/0156776 A1 | 10/2002 | Davallou |

* cited by examiner

Primary Examiner—Susan McFadden

(57) ABSTRACT

The invention provides a method of operating a voice-activated communication device. A voice input that includes a plurality of spoken numbers is received, a sequence of digits based on the plurality of spoken numbers is determined, and the sequence of digits is compared to a list of stored phone numbers. At least one proposed dialing number is presented based on the comparison. The invention also provides a system and computer usable medium including a program to operate a voice-activated communication device.

19 Claims, 2 Drawing Sheets

STRING MATCHING OF LOCALLY STORED INFORMATION FOR VOICE DIALING ON A CELLULAR TELEPHONE

FIELD OF THE INVENTION

This invention relates generally to methods of dialing a phone number. In particular, the invention relates to a method of voice-activated dialing based on string and character matching with locally stored dialing number information.

BACKGROUND OF THE INVENTION

The rapidly growing market for enhanced phone services such as voice dialing is projected to increase rapidly. Hands-free, voice-activated dialing has become particularly important for cellular phone callers.

Some mobile phone manufacturers have embedded speech-recognition technology into their phones, allowing users to program phone numbers that are matched with a spoken name. While in a programming mode, a user may create voice dial entries, for example, by speaking and recording a name or series of digits one to three times.

Some telecommunication providers offer network-based, voice-activated dialers and administer large address books of names and numbers. Because the information is on the network, users may update that information via the web and through their contact management software.

With a typical voice-activated dialer, phone users speak a phone number or contact name into the speaker of the phone to place a call. Speech-recognition software applications, which are embedded in the phone or provided on a phone service network, use automatic speech recognition (ASR) technology, also known as voice recognition. ASR systems enable a digital signal processor or central processing unit (CPU) to recognize the human voice and employ a speech-recognition vocabulary consisting of a set of utterances that a digital recognizer can identify. A most basic vocabulary might be, for example, words such as yes, no, and digits zero through nine.

In recent years, dialing services have been introduced where phone callers are able to dial the pound sign and a three-digit number on a mobile phone, to say the name of the person they want to reach such as "Mom", and to be connected to that person by the speech-recognition software. Via simple voice commands, callers can access and dial up phone numbers that they have programmed in a locally stored phone number directory by either voice or keypad input.

Speech-enabled applications offer enhanced services designed to increase productivity, efficiency and responsiveness. Some telephone services require callers to dial more digits, and thus, voice dialing is becoming a time-saving feature. New area codes are being added to many metropolitan areas, forcing callers to dial eleven digits for local calls. International calling, which continues to become more common, requires long dialing strings with access codes, country codes and, in many cases, newly lengthened city codes.

In addition to the field of mobile phone services, voice-recognition technologies have been applied to other fields such as database searches, interactive television, and computer interfaces.

Speech-enabled technologies are being explored in the field of database searches. Davallou discloses a phonetic self-improving search engine and a related method for searching databases that employ synthetic phonetic lexicons in "Phonetic Self-Improving Search Engine", U.S. patent application No. 2002/0156776 published Oct. 24, 2002. After an initial query in a primary database fails, an error database of records of previously failed searches is queried with a search string to obtain a positive result, and if no record is found still, the search string is parsed into one or more pronounceable units. Phonetically equivalent formulas are applied to one or more pronounceable units to create one or more search strings, which then are re-queried into the error memory database and the primary database. A phonetic database with phonetic equivalent formulas and their respective pronounceable units helps find possible matches with database records.

Voice-recognition software has been used with interactive televisions. An interactive, speech-enabled television system that enables a user to select channels by spoken request is disclosed in "Automatic Search of Audio Channels by Matching Viewer-Spoken Words Against Closed-Caption/Audio Content for Interactive Television" by Boman, et al., U.S. Pat. No. 6,480,819 issued Nov. 12, 2002. The system includes a semantic analyzer that is able to discriminate between speech intended to describe program content and speech intended to supply meta-commands to the system. By extracting meaning as well as keywords and phrases from the spoken input, the system finds matching content when the spoken words do not match the closed caption text exactly.

In the field of semantic computer interfaces, a method and a speech-enabled interactive computer system through which a user specifies program content is disclosed by Beauregard, et al. in "Semantic User Interface", U.S. patent application No. 2002/0156774 published Oct. 24, 2002. Commands of the semantic interface, which may be natural language-based or user-defined, allow a user to launch applications and navigate within applications by using language rather than clicks from a pointing device such as a mouse. The system extracts both keyword and semantic content from the speech of the user, prompting the user to furnish additional information when the meaning is unclear.

A number of current voice-dialing services allow callers to speak a name or phone number clearly into a phone and the system will dial based on matches to a first name, last name, full name, business name or phone number. Unfortunately, voice-recognition software is not always able to decipher voice input, particularly in the case of phone numbers. Voice recognition systems typically look for pattern matches for each individual digit in a telephone number when a user dials via voice, which can lead to one or more digits being misrecognized and can result in the potential for a misdialed number or a need to restart the voice dialing, even though the rest of the number is correct. Digits may be misrecognized due to several reasons. Systems may not be able to distinguish between, for example, the words one and nine. They may have difficulty translating, for example, the words nine thousand into the four digits of 9-0-0-0. Users may forget to give an area code. The voice input may be garbled, or background noises may be interpreted as numbers. Users may have different accents or nuances with specific numbers that a speech-recognition system has difficulty in recognizing accurately.

The above-mentioned difficulties with voice dialers for phones demonstrate the need for an improved method of operating a voice-activated cellular phone or other communication device that can better recognize phone numbers and match them with stored information when the voice input is incorrect, incomplete, or mistranslated. Accordingly, a beneficial voice-based dialing method and system would be more accurate, providing more correct matches, and when there is a voice-input error, offering alternative phone numbers that are logical to the phone user. It is an object of this invention, therefore, to provide a method of and system for operating a voice-activated communication device that places phone calls, having improvements that overcome the deficiencies and obstacles described above.

SUMMARY OF THE INVENTION

One aspect of the invention provides a method of operating a voice-activated communication device. A voice input that includes a plurality of spoken numbers is received, and a sequence of digits based on the plurality of spoken numbers is determined. The sequence of digits is compared to a list of stored phone numbers, and at least one proposed dialing number is presented based on the comparison.

Another aspect of the present invention provides a computer usable medium including a program to operate a voice-activated communication device. The computer program includes code to receive a voice input, the voice input including a plurality of spoken numbers, to determine a sequence of digits based on the plurality of spoken numbers, to compare the sequence of digits to a list of stored phone numbers, and to present at least one proposed dialing number based on the comparison.

Another aspect of the present invention provides a system for operating a voice-activated communication device.

The present invention is illustrated by the accompanying drawings of various embodiments and the detailed description given below. The drawings should not be taken to limit the invention to the specific embodiments, but are for explanation and understanding. The detailed description and drawings are merely illustrative of the invention rather than limiting, the scope of the invention being defined by the appended claims and equivalents thereof. The foregoing aspects and other attendant advantages of the present invention will become more readily appreciated by the detailed description taken in conjunction with the accompanying drawings.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
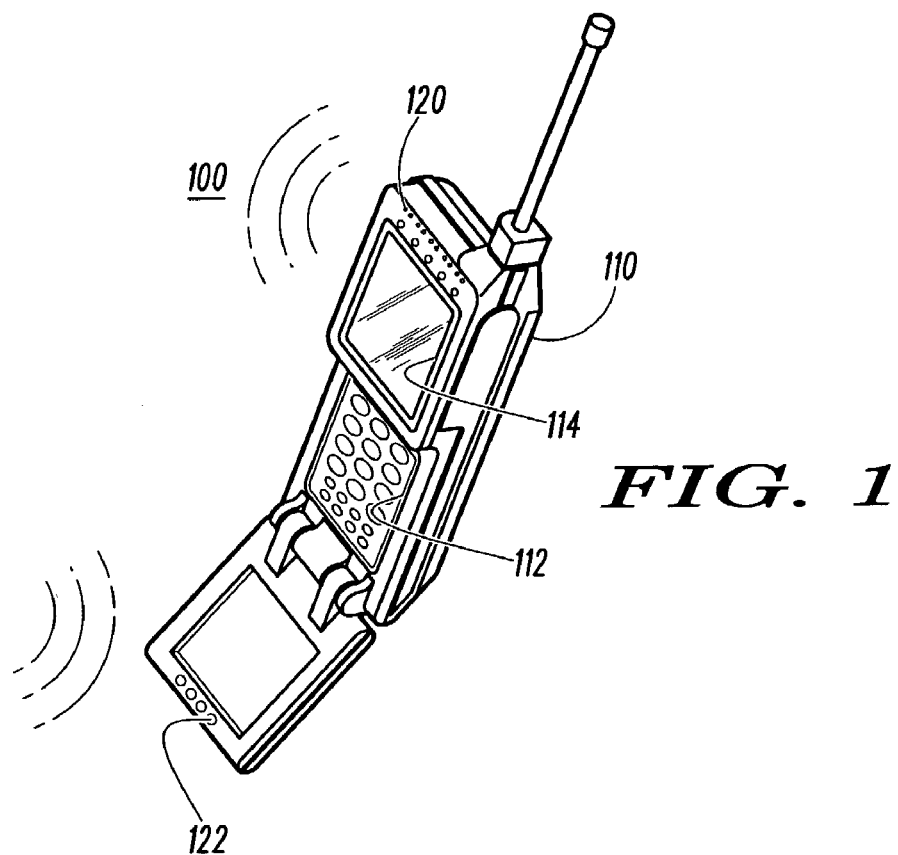
FIG. 1 illustrates a voice-activated communication device, in accordance with one embodiment of the current invention.

FIG. 1 illustrates a voice-activated communication device, in accordance with one embodiment of the present invention at 100. Voice-activated communication device 100 includes a cellular phone 110 with a speaker 120 and a microphone 122. Voice-activated communication device 100 may also include an input device 112, and a display 114.

Voice-activated communication device 100 may be used to initiate, receive, or establish connections with a telephone or network system. Voice-activated communication device 100 may be a wired or a wireless device. Voice-activated communication device 100 may be a cellular phone or, for example, a mobile handset, a personal digital assistant with calling capabilities, or any device with voice-activated connection and calling capabilities such as a base station, a home-office phone system, a small-office phone system, or a telephone system.

Input device 112 of voice-activated communication device 100 includes buttons, keys, soft-keys, a keypad, a writing tablet, or any input device suitable for providing input data or for selecting options from a menu such as a list of proposed dialing numbers.

Display 114 may include, for example, a liquid-crystal display (LCD), a plasma display, one or more light-emitting diodes (LED), an LED array, or any display device suitable for providing output data such as available functions, messages, or connection information. Display 114 may be used to present information such as proposed dialing numbers and menu options.

Speaker 120 provides audible output such that a user may hear audio signals from a sending unit, or other audio information such as voice commands, voice prompts, regenerated speech, tones, sequences of tones, or music. Speaker 120 may be used to present audio information such as proposed dialing numbers to the user. Speaker 120 is mounted typically on or in voice-activated communication device 100 in a convenient position to hear with a user's ear.

Microphone 122 receives voice or audio input from a user, such as one or more spoken numbers, commands, selections from available options, or verification of selected options. Microphone 122 converts the voice or audio input to electronic signals that can be communicated to a receiving unit, or processed within voice-activated communication device 100 to recognize commands and various messages that the user may wish to have performed. Microphone 122 is mounted typically within voice-activated communication device 100 to conveniently receive voice and audio input from a user.

Voice-activated communication device 100 includes a processor or controller for controlling the functions and operation of the device. The processor or controller may execute a program to operate the device, interpreting computer program code included with the program to perform functions such as voice dialing. The program may be stored in permanent memory within voice-activated communication device 100. Alternatively, the program may be partially stored in the device and partially within a network that is connected to voice-activated communication device 100. The program may be stored on any suitable computer usable medium, for example, solid-state memory, magnetic memory, or optical memory such as a compact disk (CD) or a digital video disk (DVD). The computer program code may be written in any suitable machine language, assembly language, or high-level language that may be stored and run by voice-activated communication device 100.

Voice-activated communication device 100 receives voice input and provides audio output. Voice-activated communication device 100 includes voice-recognition software and hardware for determining sequences of digits based on one or more spoken numbers or commands. The processor or controller within voice-activated communication device 100 may be used to compare sequences of digits to a list of stored numbers, and to determine one or more proposed dialing numbers based on the comparison. The processor or controller may be used to rank proposed dialing numbers based on, for example, an ordinal number and to present the proposed dialing numbers based on the ordinal number ranking. The processor or controller may be used to receive verification of any proposed dialing number, and to dial the verified dialing number. The processor or controller may receive, for example, a target dialing number selected from a proposed set of dialing numbers, and dial the selected dialing number.

Figure 2:
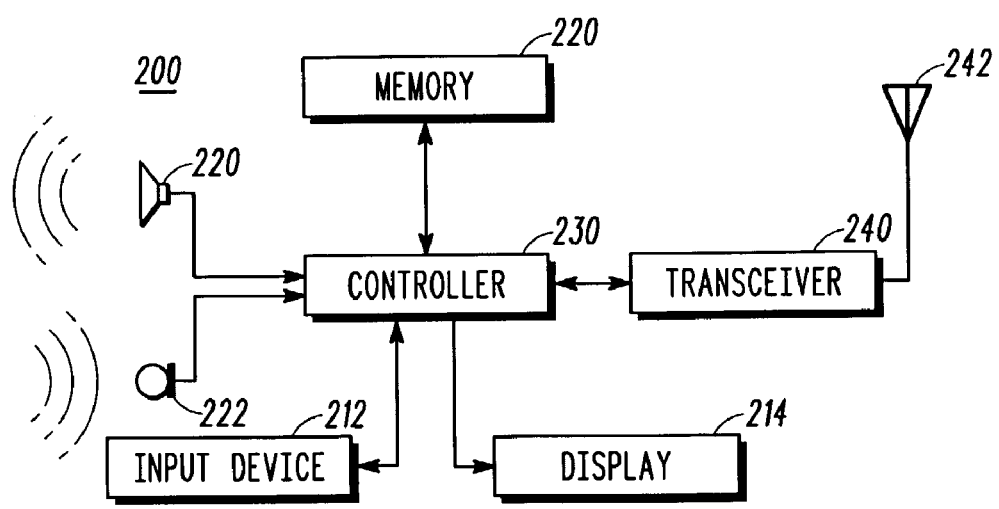
FIG. 2 illustrates schematically a system for operating a voice-activated communication device, in accordance with one embodiment of the current invention.

FIG. 2 illustrates schematically a system for operating a voice-activated communication device, in accordance with one embodiment of the present invention at 200. Voice-activated communication system 200 includes a voice-activated communication device 210 with a speaker 220, a microphone 222, a controller 230, and on-board memory 232. Voice-activated communication system 200 may also include an input device 212, and a display 214. When incorporated into a wireless communication device, voice-activated communication system 200 includes a transceiver 240 and an antenna 242.

Voice-activated communication device 210 may be a wired or wireless device that initiates, receives, or establishes communications with a telephone system or a communications network. Voice-activated communication device 210 may be, for example, a cellular phone, a mobile handset, a personal digital assistant with calling capabilities, or any device with voice-activated connection and calling capabilities.

Controller 230 is connected to speaker 220 through data converters and amplifiers such that audio messages, selections, information and other content may be sent to speaker 220 and heard by a user. Speaker 220 and controller 230 cooperate to present messages and audio information to the user, such as proposed dialing numbers. Controller 230 is connected to microphone 222 through associated amplifiers, filters and analog-to-digital converters to provide voice input in suitable digital form for further processing. Microphone 222 and controller 230 cooperate to receive voice input such as spoken numbers or commands from a user. Controller 230 may also be connected to input device 212, such as buttons, keys, soft-keys, a keypad or a writing tablet, so that entries from input device 212 may be received by controller 230. Controller 230 may also be connected to display 214, such as a liquid crystal display, a plasma display, an LED, or an LED array, so that output from controller 230 may be sent to display 214 for visual communication to the user.

Controller 230 includes a processor that executes coded programs to control the operation of voice-activated communication device 210. The computer program code, among other tasks, may receive voice input such as spoken numbers through microphone 222. Voice-recognition software may be used to determine any commands, requests and received voice input. For example, the voice-recognition software may determine a sequence of digits based on one or more spoken numbers. Voice-activated communication system 200 running computer program code compares the sequence of digits to a list of stored phone numbers that may be stored in memory 232, and presents one or more dialing numbers to a user based on the comparison. The computer program code may be stored in permanent, semi-permanent, or volatile memory, or a combination thereof.

Memory 232 is operably connected to controller 230. Instructions, status, and stored elements such as lists and other data may be transferred between controller 230 and memory 232. Computer program code that operates voice-activated communication device 210 may be stored in whole or in part in memory 232. Portions of the code may be stored temporarily or programmed permanently into controller 230.

In a wireless mode, transceiver 240 and antenna 242 are connected to controller 230 so that wireless data transfers can be sent to and from voice-activated communication device 210 using standard frequencies and protocols for voice and data transfer between interconnected devices.

Figure 3:
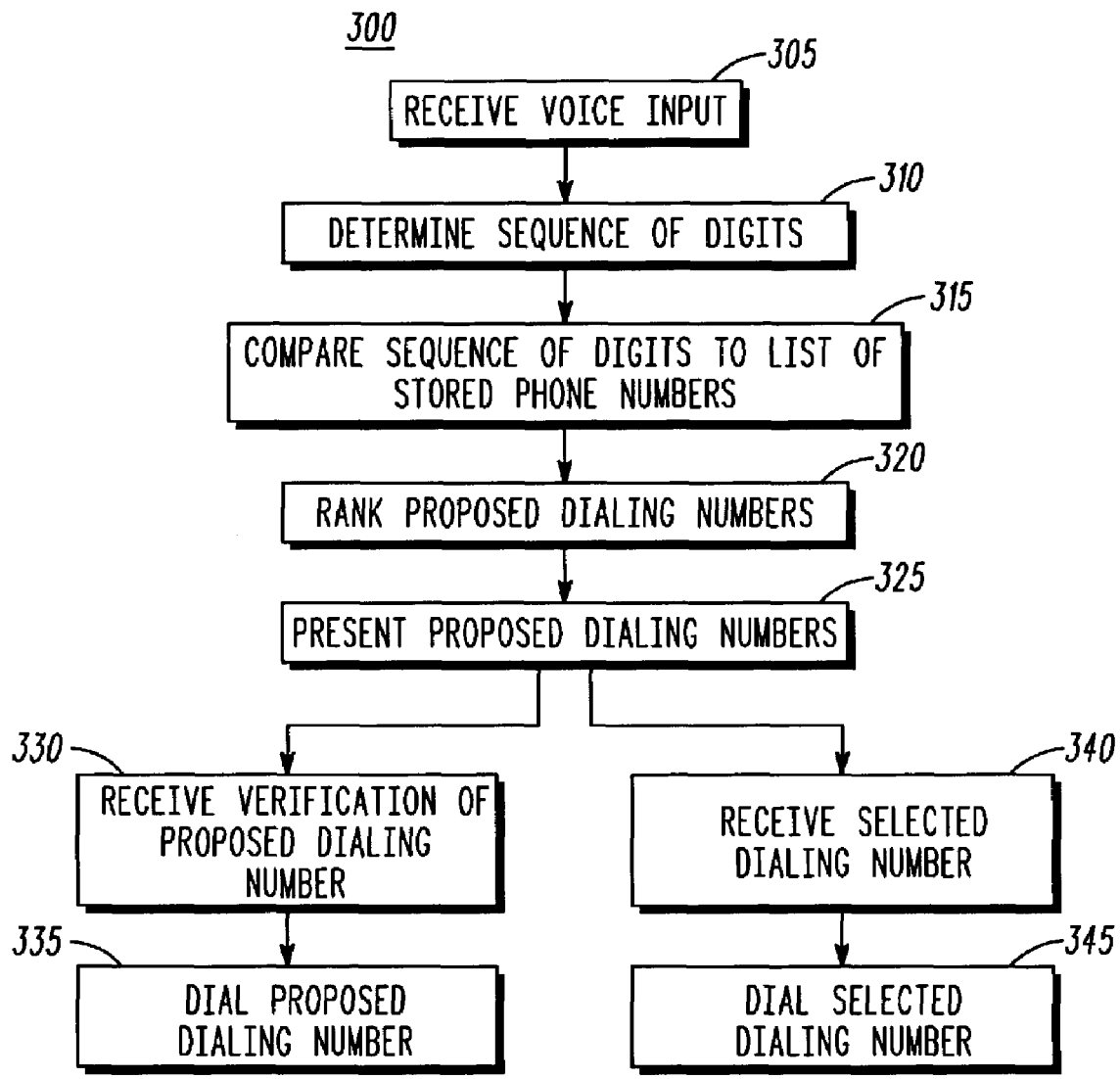
FIG. 3 shows a flow diagram of a method of operating a voice-activated communication device, in accordance with one embodiment of the current invention.

FIG. 3 shows a flow diagram of a method of operating a voice-activated communication device, in accordance with one embodiment of the present invention at 300. Voice-activated dialing method 300 includes steps to dial a phone number with a voice-activated communication device such as a cellular phone, a mobile handset, a personal digital assistant with phone capabilities, or a personal computer with phone capabilities.

A voice input that includes a plurality of spoken numbers is received, as seen at block 305. The plurality of spoken numbers may be, for example, a ten-digit calling number typical of a phone number used in the United States. The plurality of spoken numbers may be a shortened seven-digit local number or a four- or five-digit extension number. The voice input may include other content, such as a command to receive a phone number so that a call may be initiated.

A sequence of digits is determined based on the plurality of spoken numbers, as seen in 310. The sequence of digits or the voice-recognized entry may be determined using voice-recognition hardware and software contained within the voice-activated communication device. As digits are spoken and received, a corresponding character such as an ASCII number between 0 and 9 may be assigned to each spoken digit. In cases where common references to sets of numbers are received, such as nine thousand, individual digits are determined and assigned to the sequence. Other special cases may be handled during the determination, such as substituting a zero for a spoken letter "o".

When determining the sequence of digits, pattern matches on a digit-by-digit basis using voice dial may sometimes lead to one or more digits being misrecognized, even though the rest of the number is correct. Improved accuracy may be obtained by comparing the sequence of digits to frequently or recently used phone numbers. These numbers can be used as a basis for error recovery when the spoken digits are received incorrectly. Recognized numbers, both correct and incorrect, can be compared to recently stored numbers to look for matching sequences. Exact matches have high confidences of being correct. Matches that are in error by a single digit can be paired with their closest match. The user can be queried to pick one of the choices. In some cases, one of the stored numbers is the desired number, rather than the recognized sequence of digits. In other cases, the last call received, particularly when unanswered, is highly likely to be the first call made when placing a call.

The sequence of digits is compared to a list of stored phone numbers, as seen at block 315. Phone numbers in a user's phone book, last calls received, and last calls made provide valuable information about the likely recipient of a call that the voice-recognition system can use to attempt to match an entire phone number to a spoken entry. The list of stored phone numbers may comprise, for example, a set of recently called phone numbers. The list of stored phone numbers may include a set of phone numbers corresponding to recently received phone calls. The list of stored phone numbers may include a combination of recently called phone numbers and recently received phone numbers. For example, the list may comprise the last ten dialed phone numbers and the phone numbers of the last ten phone calls received by the voice-activated communication device, with repeated numbers excluded from the list.

The list of phone numbers may be dynamically loaded from internal memory such as the phone book, last calls received, and last calls made. The list of phone numbers may be stored in the memory of the voice-activated communication device or within the network to which the device is connected. The phone numbers in the list may be loaded from their stored positions into local memory within the voice-activated communication device for faster processing.

The list of phone numbers may be assigned an ordinal number corresponding to the order of the number called or the order of the number received. For example, the ordinal number one may be assigned to the phone number of the last number called or to the phone number corresponding to the last call received. The ordinal number ten may be assigned to the tenth number most recently received or called. Software in the phone may include program code to determine the order of the last phone call called or received. For example, the last phone call may correspond to the ordinal number of one, the next to last phone call may correspond to two, and so forth. The list of phone numbers and the ordinal numbers assigned to the phone numbers may be updated and modified with each incoming or outgoing call.

Software in the device attempts to match the sequence of digits of the voice-input phone number with that of the numbers in the list of stored phone numbers. When the determined sequence of digits matches exactly a listed phone number, the matched numbered may become the first or only choice for a proposed dialing number. Proposed dialing numbers refer to a set of one or more candidate phone numbers for connecting a call.

A proposed dialing number may comprise a listed phone number from the list of incoming or outgoing stored phone numbers when the determined sequence of digits from the voice input matches all digits of the listed phone number.

When there is no exact match between the determined sequence of digits and numbers in the stored list, the determined sequence of digits may be presented to the user with an audio or visual interface, and the user may respond with a verification of the number as presented or with another attempt at voice input. Alternatively, one or more dialing numbers may be proposed and presented to the user based on string matching with locally stored information.

When a portion of the determined sequence of digits matches at least a portion of a listed number from the list of stored phone numbers, the listed number may be proposed and presented to the user. String matching techniques may be used to compare the determined sequence of digits to the list of stored phone numbers. When a portion of the determined sequence of digits matches at least a portion of one or more listed phone numbers, the listed phone numbers that best match the sequence of digits may be presented to the user. For example, if nine digits of a total of ten digits in the sequence of digits match one of the phone numbers in the list of stored phone numbers except for one missing digit somewhere in the string, the phone number is a likely candidate for the intended phone number and the phone number may be presented to the user. In another example, if nine of the ten digits in the sequence of digits match one or more of the listed phone numbers except for a nine replacing a five, a five replacing a nine, or a one interchanged with a nine, the phone number is a likely candidate for the intended phone number and may be presented to the user.

In another example, when the voice input excludes an area code and a portion of the determined sequence matches a portion or all of a listed number except for the area code, the listed number is a likely candidate and may be proposed and presented to the user. Other candidate numbers include dialing numbers with eight of ten digits matched correctly or numbers with two digits interposed. Other candidate numbers may be proposed and presented when six, five or even four digits are correct, for example, when an area code is omitted or when a three-digit local prefix is omitted, which is typical for phone extension numbers within a company.

Stored phone numbers and the sequence of digits may be broken down into sub-strings that are patterned after local phone number convention to further improve recognition accuracy, since regularly recurring stored entries such as an area code are highly likely to be accurately matched to the voice input.

In the comparison of the voice-input number with the list of stored phone numbers, embedded software may determine that more than one phone number from the list of stored phone numbers matches or closely matches the sequence of digits corresponding to the voice input, and multiple phone numbers may be presented to the user.

The proposed dialing numbers may be ranked, as seen at block 320. The program may rank, for example, the phone number of the exact match as number one, the next closest match to the sequence of digits as number two, and so forth. The program may also include and present with high ranking the initial sequence of digits corresponding to the voice input for cases where the desired calling number has not recently been called or received. Alternatively, the proposed dialing numbers may be ranked based on the ordinal number in addition to the degree of matching. For example, when the matched number has only seven digits correct yet the seven correct digits correspond to the most recently dialed phone number except for the area code, the matched number may be presented first to the user because of the low ordinal number. In another example where eight of ten numbers in the sequence of digits correspond to several numbers within the list of stored phone numbers, the phone number with the lowest ordinal number may be ranked highest when presenting the proposed dialing numbers to the user.

At least one proposed dialing number is presented to the user, as seen at block 325. The proposed dialing numbers are presented based on the comparison between the sequence of digits of the phone number received from initial voice input and the phone numbers in a list of stored phone numbers. The dialing numbers may be presented, for example, based on the confidence level of the string matching. Alternatively, the dialing numbers may be presented based on the ordinal number ranking. The dialing numbers may be presented based on a combination of the confidence level of the-string matching and the ordinal number ranking. The sequence of digits received from the initial voice input may be presented with a high ranking or with special indicia to indicate that the number corresponds to the voice input as received.

One or more proposed dialing numbers may be presented using an audio interface or a visual display. A digitized voice may speak, for example, a phrase indicating the intention to give a phone number and then the sequence of digits of the proposed phone number. A display may present a list of one or more proposed dialing numbers to the user. The program may pause to receive a verification or a selection from the user.

When a single dialing number is proposed to the user, a verification of the proposed dialing number may be received from the user, as seen at block 330. The verification may comprise a verbal approval or a key entry indicating approval. The user may approve the proposed dialing number or another option may be selected, such as a repeat voice entry, perform another function, or power down.

When the proposed dialing number is verified, the proposed dialing number may be dialed, as seen at block 335. The number may be dialed to initiate a call or to return a call. The number may be dialed using suitable hardware and software within the voice-activated communication device.

When multiple dialing numbers are proposed, the user may select one target dialing number from the proposed dialing numbers. The selection of the target dialing number may be received, as seen at block 340. The selection may be received verbally using the voice-recognition software. The selection may be received with manual entry from, for example, a key depression or a selection from a menu using a suitable data-entry input device such as a keypad.

After the selection of the target dialing number is received, the selected target dialing number is dialed, as seen at block 345. The number may be dialed to initiate a call or to return a call. The number may be dialed using suitable hardware and software within the voice-activated communication device.

While the embodiments of the invention disclosed herein are presently preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of operating a voice-activated communication device, comprising:
   receiving a voice input to the voice-activated communication device, the voice input including a plurality of spoken numbers;
   determining a sequence of digits based on the plurality of spoken numbers;
   comparing the sequence of digits to a list of stored phone numbers; and
   outputting at least one proposed number which can be dialed by the voice activate communication device based on the comparison, wherein the at least one proposed dialing number comprises a listed phone number from the list of stored phone numbers when a portion of the determined sequence of digits matches at least a portion of the listed phone number that is less than all the digits of the listed phone number.

2. The method of claim 1 wherein the voice-activated communication device comprises a cellular phone or a mobile handset.

3. The method of claim 1 wherein the plurality of spoken numbers comprises a ten-digit calling number.

4. The method of claim 1 wherein the list of stored phone numbers comprises a set of recently called phone numbers.

5. The method of claim 1 wherein the list of stored phone numbers comprises a set of phone numbers corresponding to recently received phone calls.

6. The method of claim 1 wherein at least one proposed dialing number comprises a listed phone number from the list of stored phone numbers when the determined sequence of digits matches the listed phone number.

7. The method of claim 1 wherein at least one proposed dialing number comprises a listed phone number from the list of stored phone numbers when the voice input excludes an area code and a portion of the determined sequence of digits matches at least a portion of the listed phone number.

8. The method of claim 1 wherein the at least one proposed dialing number is presented using one of an audio interface or a visual display.

9. The method of claim 1 further comprising:
   ranking the proposed dialing numbers based on an ordinal number; and
   presenting the proposed dialing numbers based on the ordinal number ranking.

10. The method of claim 1 further comprising:
    receiving a verification of the proposed dialing number; and
    dialing the verified proposed dialing number.

11. The method of claim 1 further comprising:
    receiving a target dialing number selected from the proposed dialing numbers; and
    dialing the selected target dialing number.

12. A computer usable medium including a program to operate a voice-activated communication device, comprising:
    computer program code to receive a voice input to the voice-activated communication device, the voice input including a plurality of spoken numbers;
    computer program code to determine a sequence of digits based on the plurality of spoken numbers;
    computer program code to compare the sequence of digits to a list of stored phone numbers to identify at least one proposed match for dialing; and
    computer program code to output at least one proposed dialing number to the voice-activated communication device based on the comparison, wherein the at least one proposed dialing number comprises a listed phone number from the list of stored phone numbers when a portion of the determined sequence of digits matches at least a portion of the listed phone number that is less than all the digits of the listed phone number.

13. The computer usable medium of claim 12 further comprising:
    computer program code to rank the proposed dialing numbers based on an ordinal number; and
    computer program code to present the proposed dialing numbers based on the ordinal number ranking.

14. The computer usable medium of claim 12 further comprising:
    computer program code to receive a verification of the proposed dialing number; and
    computer program code to dial the verified proposed dialing number.

15. The computer usable medium of claim 12 further comprising:
    computer program code to receive a target dialing number selected from the proposed dialing numbers; and
    computer program code to dial the selected target dialing number.

16. A system for operating a voice-activated communication device, comprising:
    means for receiving a voice input, the voice input including a plurality of spoken numbers;
    means for determining a sequence of digits based on the plurality of spoken numbers;
    means for comparing the sequence of digits to a list of stored phone numbers to identify at least one proposed match for dialing; and
    means for outputting at least one proposed dialing number based on the comparison, wherein the at least one proposed dialing number comprises a listed phone number from the list of stored phone numbers when a portion of the determined sequence of digits matches at least a portion of the listed phone number that is less than all the digits of the listed phone number.

17. The system of claim 16 further comprising:

means for ranking the proposed dialing numbers based on an ordinal number; and means for presenting the proposed dialing numbers based on the ordinal number ranking.

18. The system of claim 16 further comprising:

means for receiving a verification of the proposed dialing number; and means for dialing the verified proposed dialing number.

19. The system of claim 16 further comprising:

means for receiving a target dialing number selected from the proposed dialing numbers; and means for dialing the selected target dialing number.

* * * * *